Patented July 17, 1928.

1,677,536

UNITED STATES PATENT OFFICE.

HERMANN WAGNER, OF BAD SODEN-ON-THE-TAUNUS, AND BARTHOLOMÄUS VOSSEN, OF HOCHST-ON-THE-MAIN, GERMANY, ASSIGNORS TO GRASSELLI DYESTUFF CORPORATION, OF NEW YORK, N. Y., A CORPORATION OF DELAWARE.

1-METHYL-2.5.6-TRICHLORO-3-AMINOBENZENE-4-SULPHONIC ACID AND PROCESS OF PREPARING THE SAME.

No Drawing. Application filed August 13, 1927, Serial No. 212,850, and in Germany September 11, 1926.

Our present invention relates to 1-methyl-2.5.6-trichloro-3-aminobenzene-4-sulphonic acid and process of preparing the same.

We have found, that the 1-methyl-2.5.6-trichloro-3-aminobenzene-4-sulphonic acid which is a valuable product for technical purposes, can be obtained by treating the 1-methyl-2.5.6-trichlorobenzene-4-sulphonic acid, obtainable in different ways, with nitrating agents and then reducing the nitro group.

It could not be concluded from the great number of former experiments, how the 1-methyl-2.5.6-trichlorobenzene-4-sulphonic acid nucleus, which is already occupied at five places with negative substituents, would behave towards nitrating agents. It might have been possible that the sulphonic acid would be expelled by the action of the nitrating agent and that the nitro group would take the place of the sulpho group.

We have, however, found that on nitrating the 1-methyl-2.5.6-trichlorobenzene-4-sulphonic acid the sulpho group remains entirely unattacked, whereas the nitro group easily enters the free 3-position. The 1-methyl-2.5.6-trichloro-3-nitrobenzene-4-sulphonic acid can be properly transformed into the corresponding amino acid by reduction.

The 1-methyl-2.5.6-trichloro-3-aminobenzene-4-sulphonic acid thus obtained is particularly suitable for the manufacture of azo dyestuffs fast to light.

The following example serves to illustrate our invention, but it is not intended to limit it thereto; the parts are parts by weight:

27,55 parts of 1-methyl-2.5.6-trichlorobenzene-4-sulphonic acid are dissolved at 70° C. in 85,5 parts of sulphuric acid of 97% strength. Into the solution so prepared 10,25 parts of nitric acid of 62% strength are caused to run at 70° C. in the course of 3 hours. The whole is stirred for 5 hours at 70° C., the nitrosulphonic acid which has formed is separated in known manner from the sulphuric acid and then reduced to the amino compound as usual. After having freed the mass from the iron mud which has formed during the reduction, the 1-methyl-2.5.6-trichloro-3-aminobenzene-4-sulphonic acid is precipitated by means of hydrochloric acid, separated by pressing and dried. Thus 22,5 parts of the acid are obtained in a strength of 100%.

The 1-methyl-2.5.6-trichloro-3-aminobenzene-4-sulphonic acid forms a whitish powder. It is very sparingly soluble in water, insoluble in alcohol and ether. It dissolves in concentrated sulphuric acid to a slightly yellowish solution, from which it is re-precipitated on diluting the solution with water.

We claim:

1. The process of preparing 1-methyl-2.5.6-trichloro-3-aminobenzene-4-sulphonic acid by treating the 1-methyl-2.5.6-trichlorobenzene-4-sulphonic acid with a nitrating agent and then reducing the nitro body so obtained.

2. The process of preparing 1-methyl-2.5.6-trichloro-3-aminobenzene-4-sulphonic acid by treating the 1-methyl-2.5.6-trichlorobenzene-4-sulphonic acid, dissolved in concentrated sulphuric acid at a temperature of about 70° C. with concentrated nitric acid and then reducing the nitro body so obtained.

3. As a new product, 1-methyl-2.5.6-trichloro-3-aminobenzene-4-sulphonic acid, being a whitish powder, very sparingly soluble in water, insoluble in alcohol and ether, and dissolving in concentrated sulphuric acid to a slightly yellowish solution, from which it is re-precipitated on dilution with water.

In testimony whereof, we affix our signatures.

HERMANN WAGNER.
BARTHOLOMÄUS VOSSEN.